United States Patent [19]
Chapin et al.

[11] Patent Number: 5,673,191
[45] Date of Patent: Sep. 30, 1997

[54] METHOD AND APPARATUS FOR IDENTIFYING GEOLOGICAL STRUCTURES USING WAVELET ANALYSIS OF POTENTIAL FIELDS

[75] Inventors: David A. Chapin; Charles C. Mosher, both of Plano, Tex.

[73] Assignee: Atlantic Richfield Company, Los Angeles, Calif.

[21] Appl. No.: 419,160

[22] Filed: Apr. 10, 1995

[51] Int. Cl.$^6$ .................................................. G01V 3/00
[52] U.S. Cl. .................. 364/420; 73/382 G; 324/323; 367/38
[58] Field of Search .................. 364/420, 421, 364/480, 481, 505, 506, 524, 550, 570, 572, 576; 324/323, 331, 345; 367/21, 38, 43, 73, 74; 73/382 R, 382 G

[56] References Cited

U.S. PATENT DOCUMENTS

| | | | |
|---|---|---|---|
| 5,193,077 | 3/1993 | Weigleim et al. | 367/21 X |
| 5,262,958 | 11/1993 | Chui et al. | 364/481 X |
| 5,392,255 | 2/1995 | LeBras et al. | 364/421 X |

OTHER PUBLICATIONS

Foster, et al., "Wavelet transform methods for geophysical applications," *Expanded Abstracts with Biographies:* 1994 Technical Program of the SEG International Exposition and 64th Annual Meeting (Society of Exploration of Geophysicists, Oct. 23–28, 1994), paper SP1.7, pp. 1465–1468.

Rioul, et al., "Wavelets and Signal Processing," *SP Magazine* (IEEE, Oct. 1991), pp. 14–38.

Miao, et al., "Application of the wavelet transform in seismic data processing", *Expanded Abstracts with Biographies: 1994 Technical Program of the SEG International and 64th Annual Meeting* (Society of Exploration Geophysicists, Oct. 23–28, 1994), paper SP1.6, pp. 1461–1464.

Daubechies, "Orthonormal Bases of Compactly Supported Wavelets," Comm. Pure Appl. Math. (1988), pp. 909–966.

*Primary Examiner*—James P. Trammell
*Assistant Examiner*—Edward Pipala
*Attorney, Agent, or Firm*—Anderson, Levine & Lintel

[57] ABSTRACT

A method of analyzing geological survey data of the potential field measurement type is disclosed. According to the disclosed method, discrete measurement values of the potential field, either the gravitational or magnetic field, are retrieved from memory, corresponding to either a one-dimensional or two-dimensional survey region of the earth. The discrete values are first preconditioned by the application of a noise-reduction digital filter, preferably of the Weiner type. The disclosed method then performs decomposition of the filtered discrete values using the Daubechies scale function and wavelet function of length 2. According to the preferred method, the second level low-frequency component of the first level high-frequency component is generated, and expanded by a factor of four to correspond to the range of the input discrete values. Interpolation is performed to fill in values between adjacent coefficients of this component. As a result of the disclosed method, resolution of geological structures is much improved, enabling detection and discrimination of complex and interfering structures at increased depths.

19 Claims, 8 Drawing Sheets

METHOD AND APPARATUS FOR IDENTIFYING GEOLOGICAL STRUCTURES USING WAVELET ANALYSIS OF POTENTIAL FIELDS

This invention is in the field of geological exploration, and is more particularly directed to identifying subsurface structures through analysis of gravity and magnetic field measurements.

BACKGROUND OF THE INVENTION

In the field of geological exploration, particularly as applied in the prospecting for oil and gas reservoirs, many different approaches are commonly used to acquire and analyze information regarding the depth, location, and attributes of geological structures and formations. The well known seismic prospecting approach imparts acoustic energy into the earth at one or more surface locations, and detects the acoustic energy at other surface locations, after reflection or refraction of the energy by geological structures. Analysis of the travel times of the acoustic energy through the earth along the reflected or refracted paths provides an indication of the presence, location and characteristics of subsurface structures.

Another general technique used in geological prospecting does not rely upon imparted energy, but instead is based upon the measurement of potential fields of the earth at various surface locations. These potential fields include the naturally occurring gravitational and magnetic fields of the earth. As is well known, if one were to assume the earth to be a sphere of uniform density, the measured gravitational field would vary inversely with the square of the distance of the radial distance of the measurement location from the center of the earth; similarly, if one were to assume the earth to be uniformly magnetized, the measured magnetic field would vary inversely with the cube of the distance of the measurement location from the center of the earth. Potential field surveying identifies deviations between the measured magnitude of the potential field and the magnitude expected assuming homogeneity, since such deviations are due to non-uniformities in the geological structure of the underlying earth. For example, since certain rock types are naturally more heavily magnetized than others, the magnetic field near these rock types will differ in magnitude from that expected for the particular altitude, longitude and latitude of the measurement location due solely to the earth's magnetic field. In the case of gravity, high or low density geological structures will tend to increase or decrease, respectively, the gravitational field measured at a particular location from that which would be expected at the altitude, longitude and latitude of the measurement location. Understanding of these deviations, or anomalies, in the measured potential field will provide information regarding the location and characteristics of the underlying geology.

As is well known in the art, the frequency (in the spatial domain) with which the measured potential fields vary provide an indication of the depth of the geological structure. For example, a short wavelength (high frequency) deviation in the measured space-domain potential field indicates the presence of a geological structure near the surface of the earth, while long wavelength (low frequency) deviations of the potential field possibly indicate structures at deeper depths within the earth. The difference in frequency of these deviations is largely due to the attenuating effect of the earth, since higher frequency signals are more strongly attenuated by a given thickness of the earth than are lower frequency signals. As such, frequency domain analysis of potential field measurements can be useful in determining the depth of particular geological structures. Fourier techniques are therefore commonly used in the analysis of potential field measurements.

However, it has been observed that certain ambiguities and difficulties in the analysis of potential field anomalies exist when conventional Fourier techniques are used. For example, a significant signal at a low frequency may be produced both by a deep and sharply defined structure, and also by a relatively smooth and shallow structure. Conventional Fourier analysis is unable to distinguish these structures from one another.

In addition, overlying shallow structures can mask the effects of deeper structures of interest on the measured potential field anomalies. FIG. 1 illustrates a cross-section of the earth in which low density salt layer 2 overlies high density basement layer 4; in this case, the gravitational deviations produced by low density salt layer 2 will cancel out gravitational deviations produced by high density basement layer 4, since the polarities of the deviations at the same spatial location oppose one another. Such interference is especially troublesome for magnetic surveys, as magnetic field deviations are primarily present at sharp edges of the structure. FIG. 2 illustrates is an example of a cross-section of the earth in which the tip of overlying magnetic overthrust region 6 and the embedded iron-bearing structures 8 will overwhelm any magnetic field deviations from underlying basement layer 10.

Adjacent but not overlying structures can also interfere with the measured potential field deviations produced by a geological structure. FIG. 3 illustrates a partial cross-section of the earth in which highly featured structures 12, 14, 16 are closely spaced relative to one another. If the detectable wavelength of deviations in the potential field is not short enough for the depth of structures 12, 14, 16, conventional analysis will be unable to distinguish structures 12, 14, 16 from one another; instead, the measured potential field will indicate the presence of only a single layer. Still higher resolution is required to distinguish complexities in the formation structure, such as the overhang of structure 12 and the double peak of structure 14.

Yet another difficulty in the analysis of potential field measurements using conventional Fourier techniques is presented by variations in the elevation of the surface locations. As noted above, the geomagnetic field and gravitational field varies inversely with at least the square of the distance of the measurement from the center of the earth. As such, deviations in the measured potential field caused by changes in elevation must be taken into account in the analysis; however, this process is somewhat difficult and complex according to conventional Fourier techniques.

These ambiguities, masking effects, and interference effects significant limit the ability of conventional Fourier analysis to detect important geological structures from potential field measurement data.

Heretofore, Fourier analysis of potential field measurements by conventional techniques has also been quite cumbersome, primarily because of the infinite integrals required. Accordingly, Fourier analysis of a small locality requires processing of the entire potential field dataset using a single operator. As is also well known in the art, the Heisenberg Uncertainty Principle indicates that, in the frequency domain, one may obtain excellent frequency resolution but poor spatial resolution; conversely, in the time domain, one may obtain excellent spatial resolution but poor frequency resolution. In other words, Fourier filters only imprecisely identify spatial locations when potential field measurements behave differently within specified frequency ranges. Accordingly, the frequency domain power spectrum of potential field measurements resulting from Fourier analysis will not closely specify the spatial locations at which important transient behavior occurs. Since spatial localization is important in the field of geological prospecting, conventional Fourier analysis techniques as applied to potential field measurements have limited value in the case where different wavelengths are of interest at different locations of the same survey area, as is typical in many regions.

Finally, as noted above, higher frequency components of potential field measurements are significantly more attenuated with increasing depth of the structure. In other words, the resolution of geological structures using conventional potential field measurements decreases with increasing depth of the structures of interest. As such, conventional potential field analysis techniques are limited in their ability to identify interesting structures at significant depths.

By way of further background, the field of wavelet analysis has recently become popular in the analysis of the time (or space) and frequency response and behavior of signals. In the general sense, wavelet analysis is concerned with performing time-frequency (or space-frequency) localization of the signal under analysis. Time-frequency localization refers to the analysis of a portion of the frequency spectrum of the input signal over a selected time window; analogously, space-frequency localization is the analysis of a portion of the frequency spectrum of a signal over a selected space-domain window.

Wavelet analysis has been used in the field of seismic prospecting, particularly in improving the resolution of seismic analysis in detecting thin or fine structures from scattered seismic data. Examples of the use of wavelet analysis in the field of seismic data processing are described in Foster, et al., "Wavelet transform methods for geophysical applications", *Expanded Abstracts with Biographies: 1994 Technical Program of the SEG International Exposition and 64th Annual Meeting* (Society of Exploration Geophysicists, Oct. 23–28, 1994), paper SP1.7, pp. 1465–68, and in Miao, et al., "Application of the wavelet transform in seismic data processing", *Expanded Abstracts with Biographies: 1994 Technical Program of the SEG International Exposition and 64th Annual Meeting* (Society of Exploration Geophysicists, Oct. 23–28, 1994), paper SP1.6, pp. 1461–64.

It is an object of the present invention to provide a method of analyzing potential field measurements that has improved resolution in detecting geological structures.

It is a further object of the present invention to provide such a method that is applicable to both gravitational and magnetic measurements.

It is a further object of the present invention to provide such a method that can distinguish relatively deep geological structures from shallower structures.

It is a further object of the present invention to provide such a method that is less vulnerable to interference from overlying or nearby structures when detecting relatively deep structures of interest.

It is a further object of the present invention to provide such a method that can operate on only a portion of the available data set when analyzing a locality.

Other objects and advantages of the present invention will be apparent to those of ordinary skill in the art having reference to the following specification together with its drawings.

SUMMARY OF THE INVENTION

The invention may be implemented into a computer system for performing wavelet decomposition of measured potential fields, such as the gravitational and geomagnetic fields of the earth. Wavelet decomposition of the measured potential fields, either in a one-dimensional or two-dimensional arrangement is performed, in which a selected component of the decomposition is retained that identifies the localized smallest wavelength of significant information in the measured potential field. Preferably, the wavelet decomposition is performed using a Daubechies wavelet of length 2. In this case, the decomposition is carried out to the second level, and the low frequency component of the high frequency first-level decomposition result is retained. Interpolation is performed to expand the retained component to correspond to the spatial area under analysis. The resolution with which geological structures can be detected is greatly improved by the wavelet decomposition.

DETAILED DESCRIPTION OF THE PREFERRED EMBODIMENT

Figure 1:
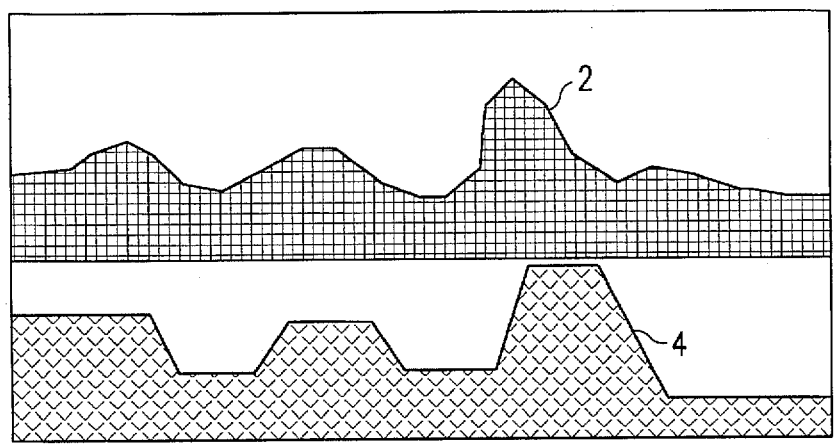
FIGS. 1, 2 and 3 are cross-sectional views of the earth, indicating problematic geological structures for conventional potential field analysis techniques.
Figure 2:
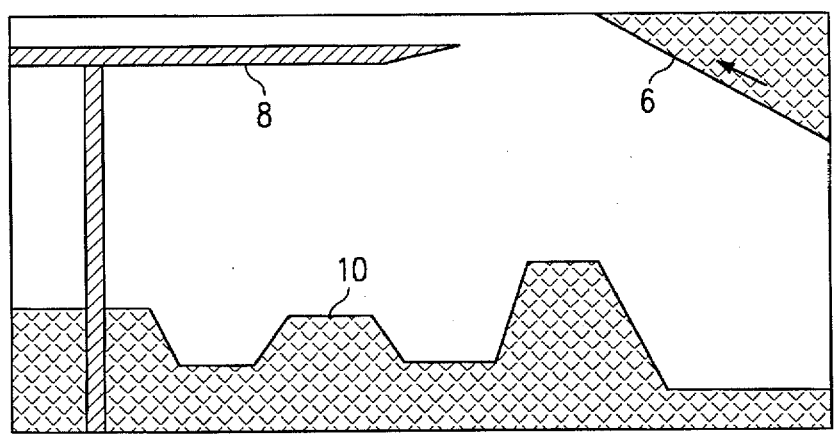
Figure 3:
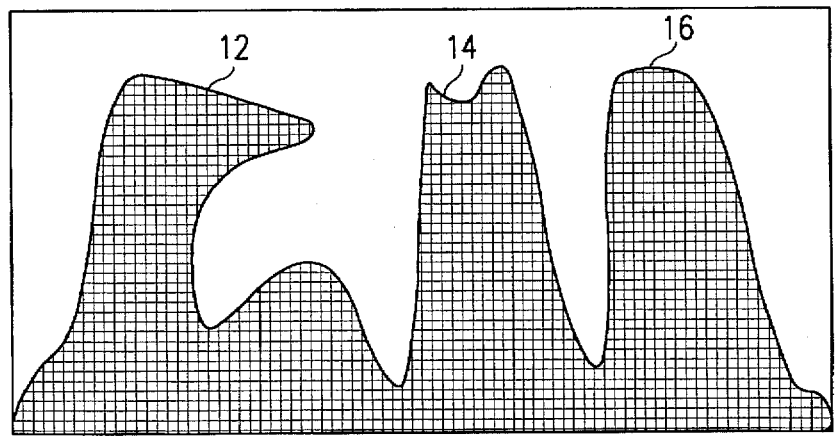
Figure 4:
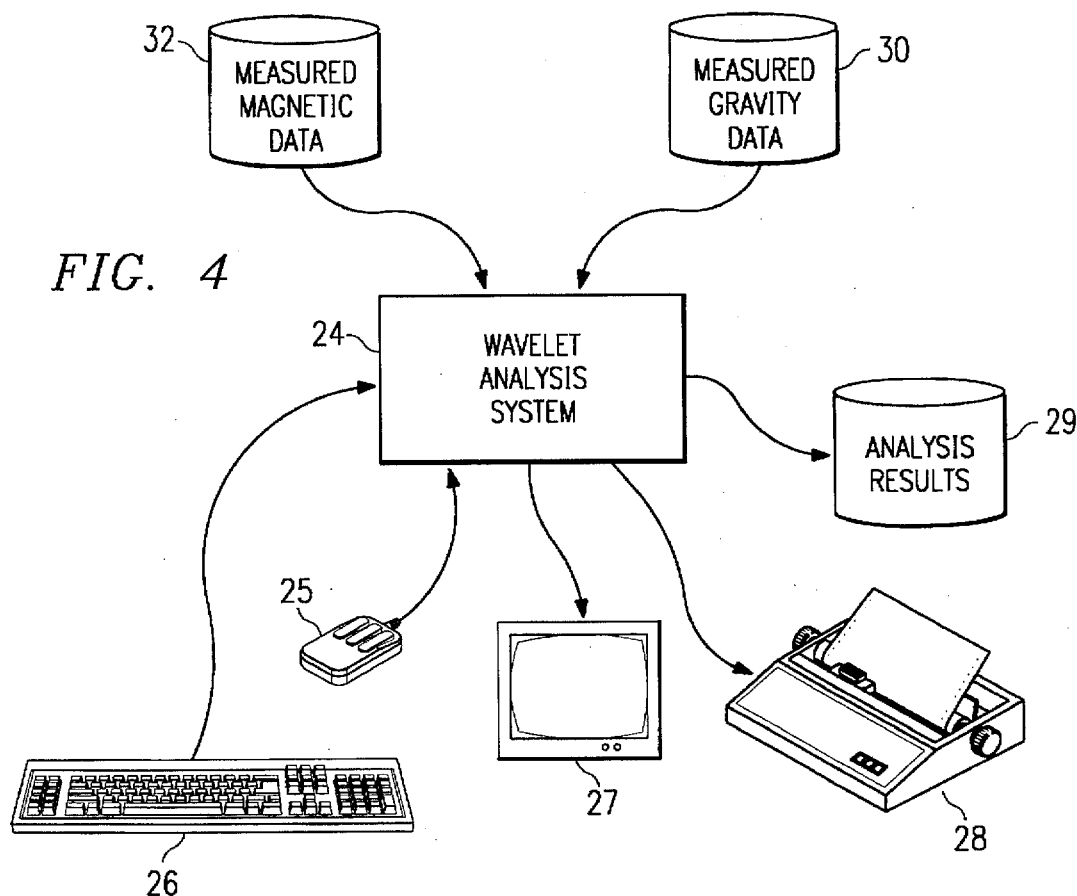
FIG. 4 is an electrical diagram, in block form, of a computer system suitable for performing the method of the preferred embodiment of the invention.

Referring now to FIG. 4, a system according to the preferred embodiment of the invention for analyzing potential field measurements over a region of the earth, such potential field measurements including either or both of gravitational field measurements and geomagnetic field measurements, will now be described. As shown in FIG. 4, the system of the preferred embodiment of the invention includes wavelet analysis system computer 24. System computer 24 may be implemented by any conventional personal computer or workstation, preferably an UNIX-based workstation such as a SPARCstation available from Sun Microsystems, Inc. System computer 24 may be implemented either in standalone fashion, or as part of a network arrangement. According to the preferred embodiment of the invention, system computer 24 presents output primarily onto graphics display 27, or alternatively via printer 28; further in the alternative, system computer 24 may store the results of the analysis described hereinbelow on disk storage 29, for later use and further analysis. Keyboard 26 and mouse 25 are provided with system computer 24 to enable interactive operation. System computer 24 is able to communicate with disk storage devices, including external hard disk storage on a network and floppy disk drives. In this embodiment of the invention, system computer 24 is able to retrieve measured gravitational field data from disk storage 30, and measured magnetic field data from disk storage 32. It is contemplated that disk storage devices 30, 32, are implemented by way of a local area network or by remote access. While disk storage devices 30, 32, (and 29) are illustrated as separate devices, since they correspond to data from different sources at different times, a single disk storage device may of course be used to store any and all of the measurement data, as appropriate.

In addition, as will be apparent from the following description, the preferred embodiment of the present invention is applicable to either geomagnetic field measurements or to gravitational field measurements, and need not be applied to the combination thereof. As such, it is contemplated that many systems will have only one of the data sets illustrated in FIG. 4. Furthermore, it is contemplated that a particularly useful benefit of the preferred embodiment of the invention is its ability to correlate magnetic or gravitational analysis with seismic survey data; as such, the system of FIG. 4 may additionally access disk storage containing seismic survey and well log results for the region of the earth corresponding to the gravity or magnetic data in disk storage 30, 32.

Figure 5:
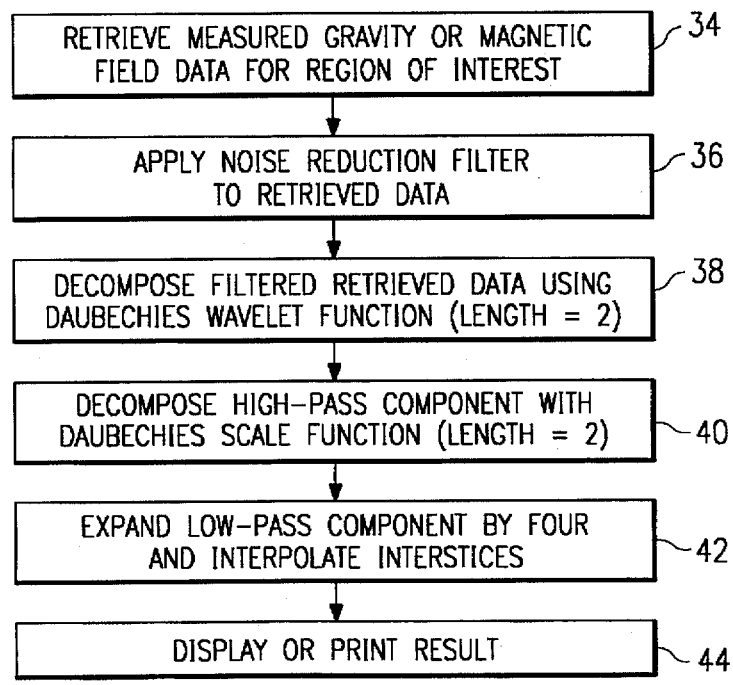
FIG. 5 is a flow chart illustrating the preferred embodiment of the present invention.
Figure 6:
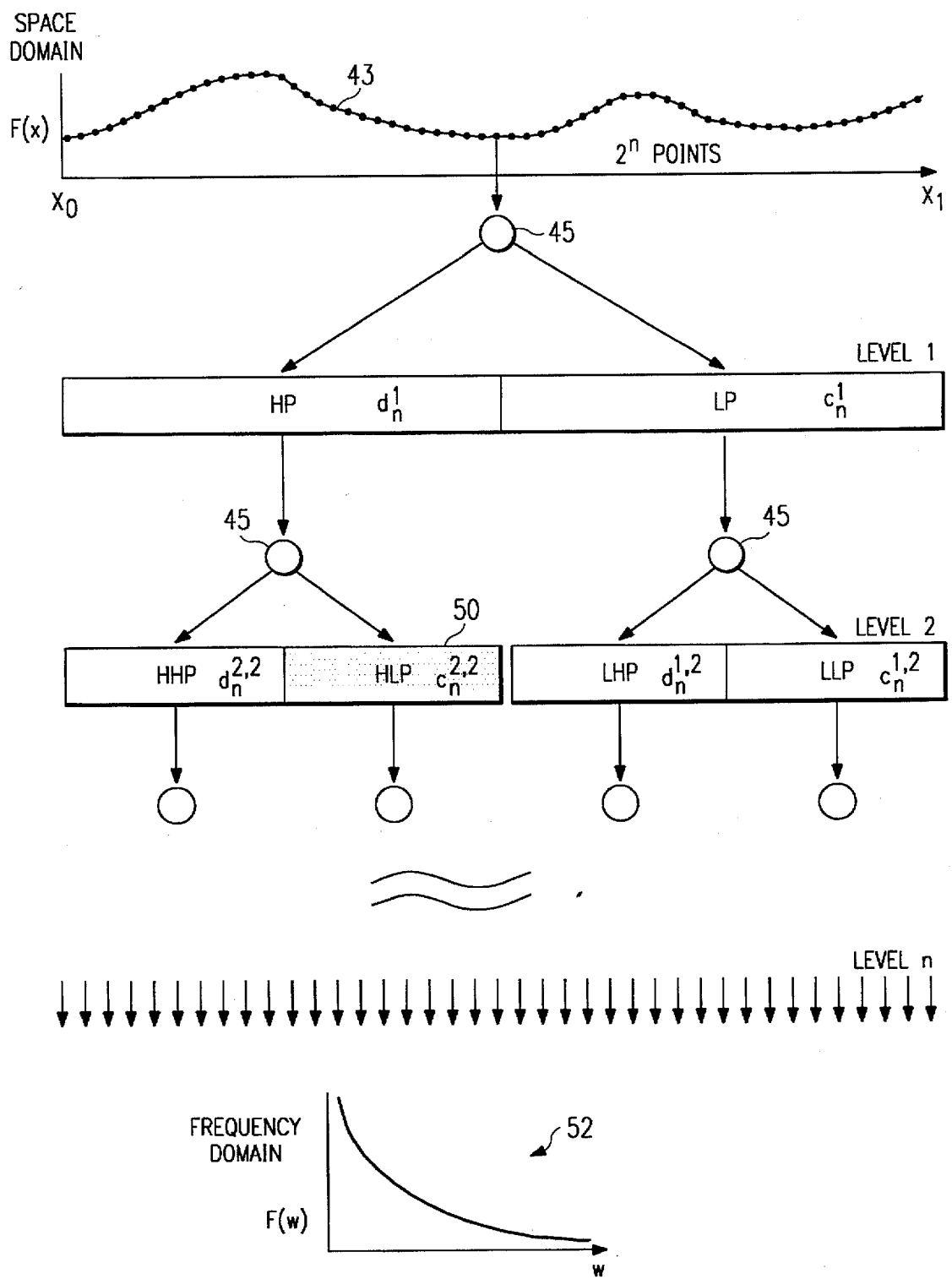
FIG. 6 is a schematic diagram illustrating wavelet decomposition of a space domain function, and illustrating selection of the particular packet according to the preferred embodiment of the invention.

Referring now to FIGS. 5 and 6, the method of analyzing potential field data according to the preferred embodiment of the invention will now be described in detail. The method of FIG. 5 is performed by system computer 24 in this example. In process 34, the desired potential field measurement data is retrieved from disk storage 30, 32. As noted above, the method of this embodiment of the invention is applied individually to gravity or geomagnetic measurement data. As such, process 34 will generally retrieve either gravity measurement data from disk storage 30, or magnetic measurement data from disk storage 32. In either case, the measurement data corresponds to the magnitude of the measured potential field at a particular spatial location in the survey area.

Since the preferred embodiment of the invention is performed in digital form, the data stored in memory and retrieved in process 34 of course corresponds to discrete data values for discrete positions in the survey region (rather than as an explicitly expressed continuous function in the space domain). Accordingly, the data retrieved in process 34 is a discrete space-domain representation of measurements of the potential field over a selected portion, or range, of the survey region of interest. This representation may be a one-dimensional representation of the measured amplitude along a line in the survey area. In the example of FIG. 6, plot 43 is of a discrete representation M(x) of the measured potential field as a function of the x distance in the survey area, over a range from $x_0$ to $x_1$, with each point corresponding to a particular location along the survey line. Alternatively, the data retrieved in process 34 may be a two-dimensional representation of the measured data, with each magnitude value corresponding to a surface location expressed by x and y coordinates. While the wavelet analysis method of this embodiment of the invention operates on either a one-dimensional or two-dimensional representation, the following description will address the one-dimensional case, for ease of understanding. It is contemplated that one of ordinary skill in the art having reference to this specification will be able to readily apply the present method to the two-dimensional case, considering that wavelet transformation is generalizable to two dimensions in much the same way as in the case of two-dimensional Fourier transformation.

After retrieval of the desired data set, process 36 is next performed in which a noise-reduction digital filter is applied to the retrieved data set. As will become apparent hereinbelow, the wavelet analysis technique of this embodiment of the invention identifies the highest frequency component of interest in the potential field data at each location. It has been observed, however, that this benefit of the present invention is vulnerable to high frequency noise resulting from measurement error and other artifacts. Accordingly, it is preferred to apply a noise-reduction filter to remove components from the retrieved data having wavelengths shorter than those of interest in the geological analysis. The preconditioning of process 36 is preferably performed using a conventional Weiner digital filter, which despikes the data to a user-controlled minimum amplitude. Typically, an amplitude of about 1% of the total amplitude range is utilized. Such digital filtering may be readily performed by computer system 24 in the usual manner well known in the art.

Following the filtering of process 36, process 38 is performed in which the filtered retrieved data from process 36 is decomposed by computer system 24, to a first level, according to wavelet analysis. As is well known in the art, wavelet decomposition is performed by convolving a scale function with the input signal to generate a low-pass component, and by convolving a corresponding wavelet function with the input signal to generate a high-pass component. Many scale-wavelet function pairs are known in the art, as useful for time-frequency (or space-frequency) analysis, or as useful in data compression methods. Furthermore, as is known in the art, wavelet decomposition is readily performable by computers such as system computer 24, primarily by way of digital matrix operations performing decimated convolutions.

Referring to FIG. 6, a schematic example of wavelet decomposition is illustrated. Input signal 43 in this example is a one-dimensional discrete function F(x) in the space domain, having a magnitude value corresponding to each of $2^n$ points in the x-dimension. First level decomposition is indicated by operator 45 of FIG. 6, in which a scale function is convolved with input signal 43 to produce a low-pass component (LP), and in which a corresponding wavelet function is convolved with input signal 43 to produce a high-pass component (HP).

As will be noted hereinbelow, the preferred decomposition is according to the well-known Daubechies scale and wavelet functions described in Daubechies, "Orthonormal Bases of Compactly Supported Wavelets", *Comm. Pure Appl. Math.* (1988), pp. 909–966, incorporated herein by reference. The Daubechies decomposition effectively uses quadrature mirror low-pass and high-pass filters that decompose the input signal by decimated convolutions. Mathematically, a discrete input signal function f may be expressed as the sum of a coefficient sequence $c_n^0$ convolved with the Daubechies scaling function $\phi_{0,n}$ as follows:

$$f \equiv \sum_n c_n^0 \phi_{0,n} \quad (1)$$

First level decomposition of this discrete input function f provides a low-pass coefficient sequence $c^1_n$ and a high-pass coefficient sequence $d^1_n$ as follows:

$$\sum_n c_n^0 = \sum_n \{c_n^1 \phi_{1,n} + d_n^1 \psi_{1,n}\} \quad (2)$$

where $\phi$ and $\psi$ are the Daubechies scale and wavelet functions, respectively. As is known in the art, the Daubechies scale and wavelet functions are not expressible as explicit formulae, but instead are readily representable in matrix form for application in convolutional filters. See Daubechies, "Orthonormal Bases of Compactly Supported Wavelets", *Comm. Pure Appl. Math* (1988), at p. 980.

The wavelet decomposition may continue by applying the convolutional filters to the components of each level to further decompose the decomposition results in additional levels. Upon completion of the decomposition to level n, where the input signal consisted of $2^n$ discrete values, a power spectrum 52 in the frequency domain will be produced. In other words, the space-domain input signal F(x) will have been fully transformed into a frequency domain signal $\Im(\omega)$.

According to the present invention in its most general sense, however, a specific decomposition component has particular importance in identifying geological structures that are not otherwise apparent. As such, the full decomposition is neither necessary nor useful in the analysis of the potential field data of this embodiment of the invention. Accordingly, both the low-pass and high-pass components do not need to be generated in any level, once the particular component has been identified for the particular wavelet function and corresponding scale function to be used. Furthermore, not all n levels are necessarily required in the analysis; as such, the particular desired component can be mathematically considered to be in both the space and frequency domains.

As noted above, the preferred embodiment of the invention uses the well-known Daubechies scale and wavelet functions in its decomposition. In particular, attention is directed to the above-incorporated Daubechies paper, relative to its Table 1, in which coefficients for the wavelets commonly referred to as the "Daubechies" wavelets are presented. Daubechies, "Orthonormal Bases of Compactly Supported Wavelets", *Comm. Pure Appl. Math.* (1988), p. 980. According to the preferred embodiment of the invention, the wavelet corresponding to the case N=2 (i.e., of length=2) is utilized in the decomposition.

Also according to the preferred embodiment of the invention, the decomposition result of interest is the second-level low-frequency component of the first-level high- frequency component. Referring to FIG. 6, component HLP (50) in the second level is the decomposition result that provides improved resolution and detection in the geological analysis of potential field measurements. Accordingly, process 38 of FIG. 5 generates only the first level high-pass component by the convolution of the Daubechies wavelet function $\psi$ of length 2 (i.e., the convolutional operator has two points) to the input signal function F(x), thus producing the high-pass coefficient sequence $d^1_n$ (shown as block 47 in FIG. 6). As is known in the art, this high-pass coefficient sequence will have one-half the number of values as the input signal F(x), as the filtering effectively down-samples the input signal by a factor of two.

Process 40 is then performed to further decompose the high-pass coefficient sequence $d^1_n$ from process 38. However, in this preferred embodiment of the invention, only the low-pass component of the coefficient sequence $d^1_n$ is necessary. As such, process 40 convolves the Daubechies scale function $\phi$ of length 2 with coefficient sequence $d^1_n$, producing a coefficient sequence $c^{2,2}_n$ shown as component 50 (HLP) of FIG. 6. This coefficient sequence $c^{2,2}_n$ is commonly referred to in the art as level 2, packet 3. As before, the convolution results in a downsampling by a factor of two; as such, component 50 has one-fourth the number of values as that of the input signal F(x).

According to the preferred embodiment of the invention, where the desired component is packet 3, level 2 produced by Daubechies scale and wavelet functions of length 2, wavelet decomposition is complete. Process 42 is then performed to expand coefficient sequence $c^{2,2}_n$ by a factor of four, so as to correspond, along the x-axis in the space-domain, to the range represented by input signal F(x). Intermediate points are filled in by linear interpolation, so that the result of process 42 is a discrete function having the same number of data points as that of input signal F(x), so as to spatially correspond to the survey area represented by input signal F(x). In this example, linear interpolation is performed to provide three intermediate points between each of the values of coefficient sequence $c^{2,2}_n$. System computer 24 then presents the expanded decomposition result on graphics display 27 or via printer 28, for viewing and consideration by the human analyst, or stores the expanded decomposition result in disk storage 29 for later use.

Figure 7:
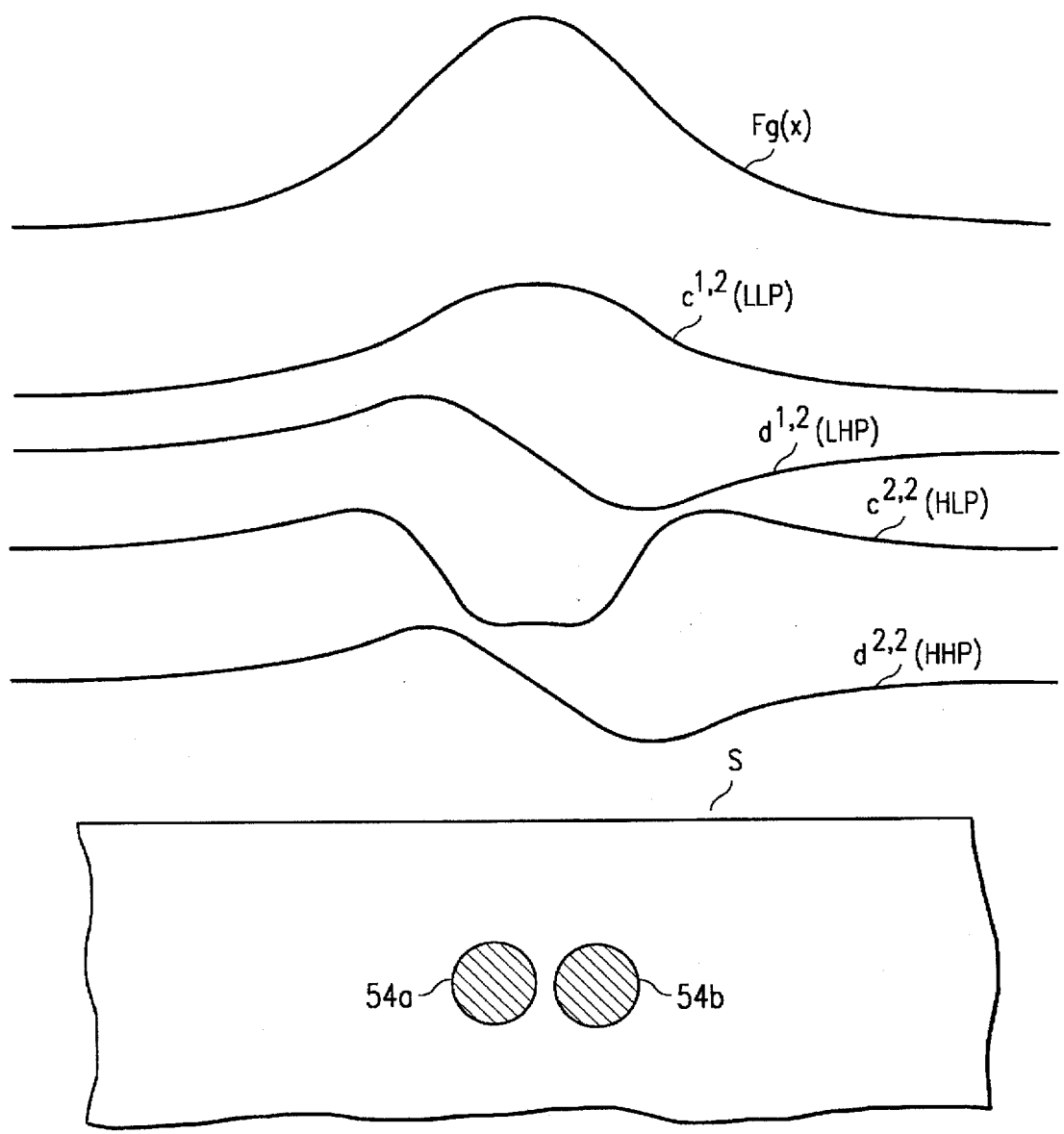
FIG. 7 is a simulated example illustrating the ability of expanded second level decomposition components to distinguish geological structures.

Referring now to FIG. 7, an example of the preferred embodiment of the invention as applied to a simulation of spherical geological structures 54a, 54b at a certain depth below the surface S of the earth will now be illustrated, in the case of simulated gravitational deviations. In the simulation of FIG. 7, structures 54a, 54b have significantly higher density than the surrounding formation, resulting in positive deviation of gravitational field at surface locations thereabove. FIG. 7 illustrates the simulated deviation of gravitational field $F_g(x)$ produced by structures 54a, 54b. As is evident from the shape of $F_g(x)$, one cannot distinguish structures 54a, 54b from one another merely from simple viewing of the gravitational field; the plot of $F_g(x)$ instead indicates only a single structure. In other words, the resolution of the gravitational field is too coarse to discriminate structures 54a, 54b from one another.

FIG. 7 also illustrates the four components resulting from second level wavelet decomposition of the function $F_g(x)$. Each of these components has been expanded by a factor of four, with interpolation providing the intermediate values, as discussed above relative to process 42 of FIG. 5. As is evident from FIG. 7, three of the four components (namely $c^{1,2}$, $d^{1,2}$, $d^{1,2}$, corresponding to the LLP, LHP, HHP, components of FIG. 6) also do not serve to discriminate structures 54a, 54b from one another. However, the HLP component, namely coefficient sequence $c^{2,2}$ indeed discriminates structures 54a, 54b from one another, by way of the double valley in its plot. It should be noted that the polarity of the HLP component is opposite that of the gravitational deviation caused by structures 54a, 54b, and should be taken into account. The simulated example of FIG. 7 thus illustrates that the preferred embodiment of the invention improves the resolution of gravitational surveys.

In the case of the Daubechies wavelet used in this example, it is therefore contemplated that the analysis of the preferred embodiment is quite efficient in that it need only perform the wavelet decomposition in the first level (process 38) and the scale function decomposition in the second level (process 40) to arrive at the most useful component. In other words, the LLP, LHP, HHP, components of FIG. 6 need not be generated when generating the useful HLP component. Alternatively, the method of this embodiment of the invention may be performed by producing each of the four components, thus producing a comparative output similar to that shown in FIG. 7.

Figure 8:
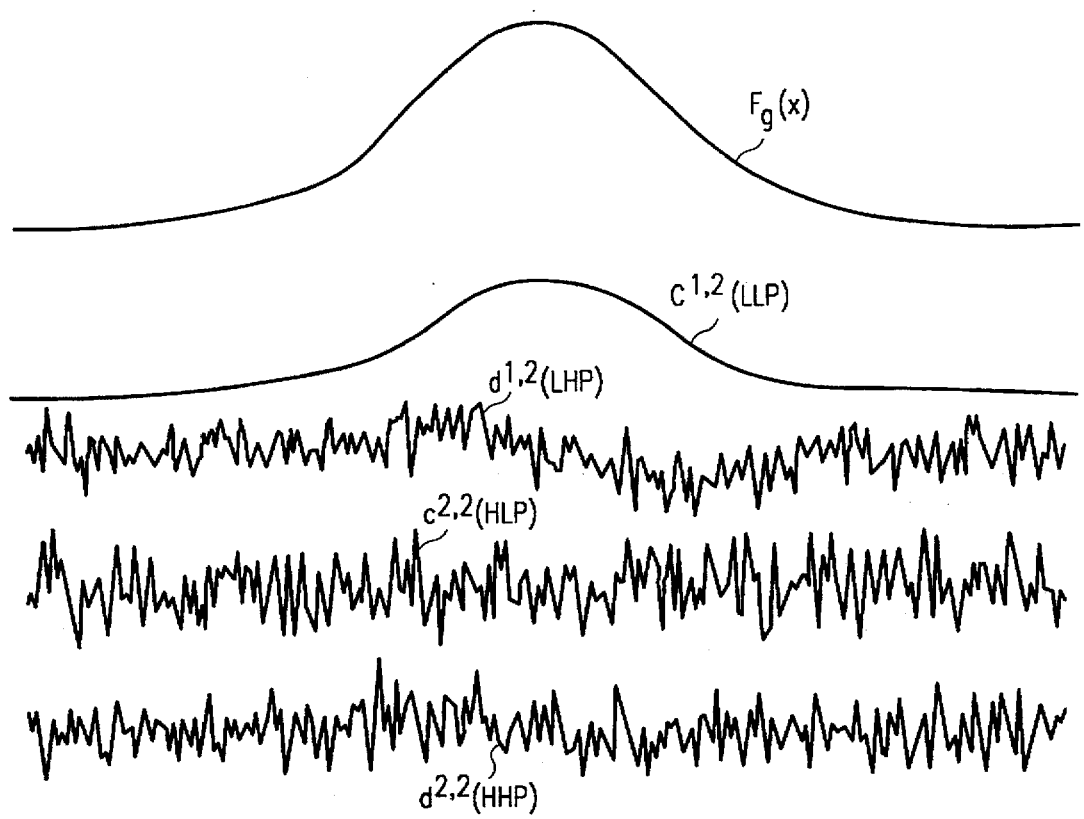
FIG. 8 illustrates the expanded second level decomposition components of FIG. 7 if not filtered.

As noted above, the preconditioning of the input signal by noise-reduction filter process 36 is useful in enabling the method of the preferred embodiment of the invention to improve the resolution of the analysis. Such filtering was included in the simulation of FIG. 7. By way of example, FIG. 8 illustrates a signal $F'_g(x)$ which corresponds to the signal $F_g(x)$ of FIG. 7 with a high-frequency noise component added thereto, along with its resulting four second-level decomposition components in the case where no filtering is performed prior to decomposition. As evident from FIG. 8, the coefficient sequence $c^{2,2}$ is the only decomposition result that provides any useful information; however, it provides no additional resolution to that of signal $F'_g(x)$, and in fact has less resolution considering that it corresponds to a low-pass filtered version thereof. Filtering of the input signal prior to application of wavelet decomposition according to the preferred embodiment of the present invention is therefore quite beneficial.

Figure 9A:
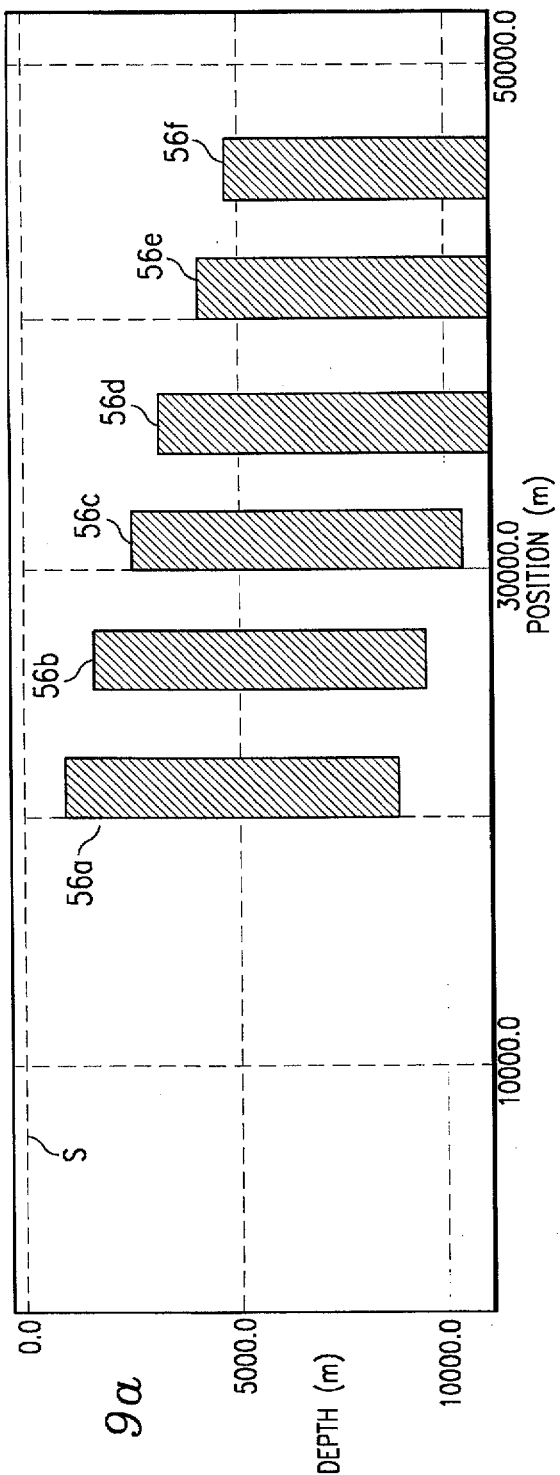
FIGS. 9a and 9b illustrate a simulated example of the preferred embodiment of the invention in distinguishing interfering Horst blocks at varying depths.
Figure 9B:
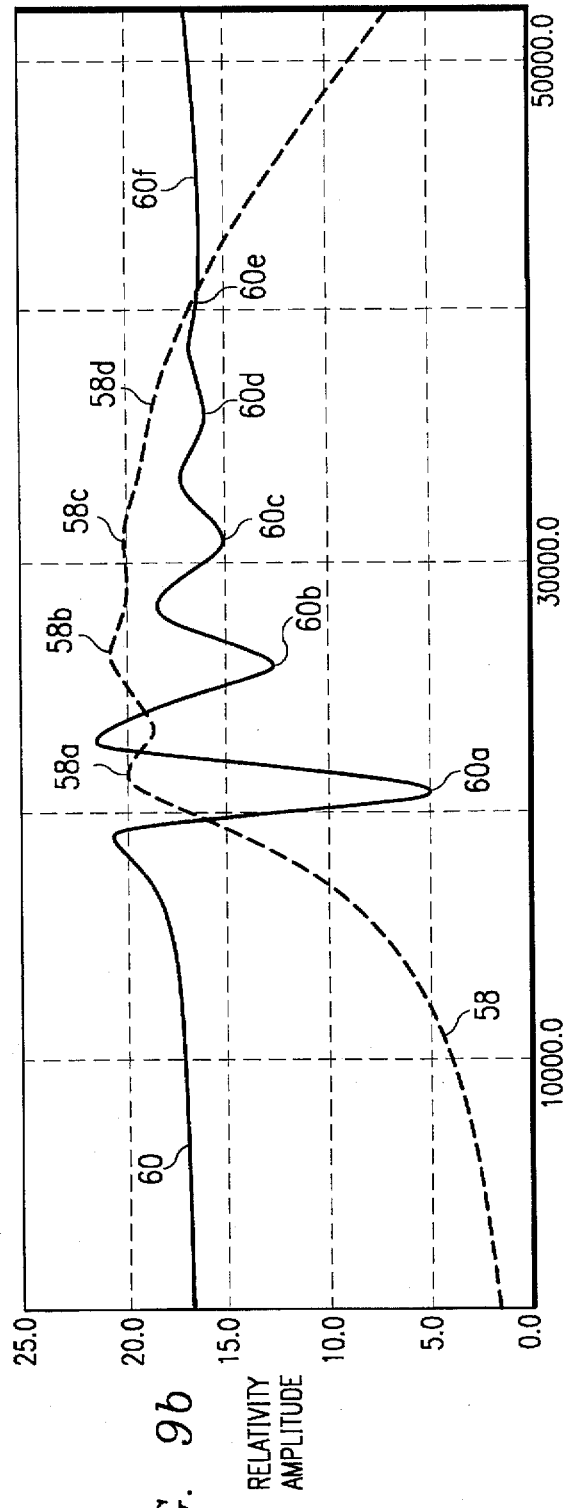

Referring now to FIGS. 9a and 9b, another simulation result of the present invention is illustrated in which closely spaced (and thus potentially interfering) Horst blocks 56 are presented at varying depths. In this example, as shown in FIG. 9a, each of Horst blocks 56 simulates a geological structure of 2 km width and 8 km depth and having of a density contrast of 0.1 gm/cm³ with respect to surrounding formations. Horst blocks 56 are laterally spaced apart by approximately 5000 meters (centerline to centerline), and have tops that decrease in depth into the earth from a depth of approximately 800 meters for Horst block 56a to approximately 4800 meters for Horst block 56f.

Figure 10:
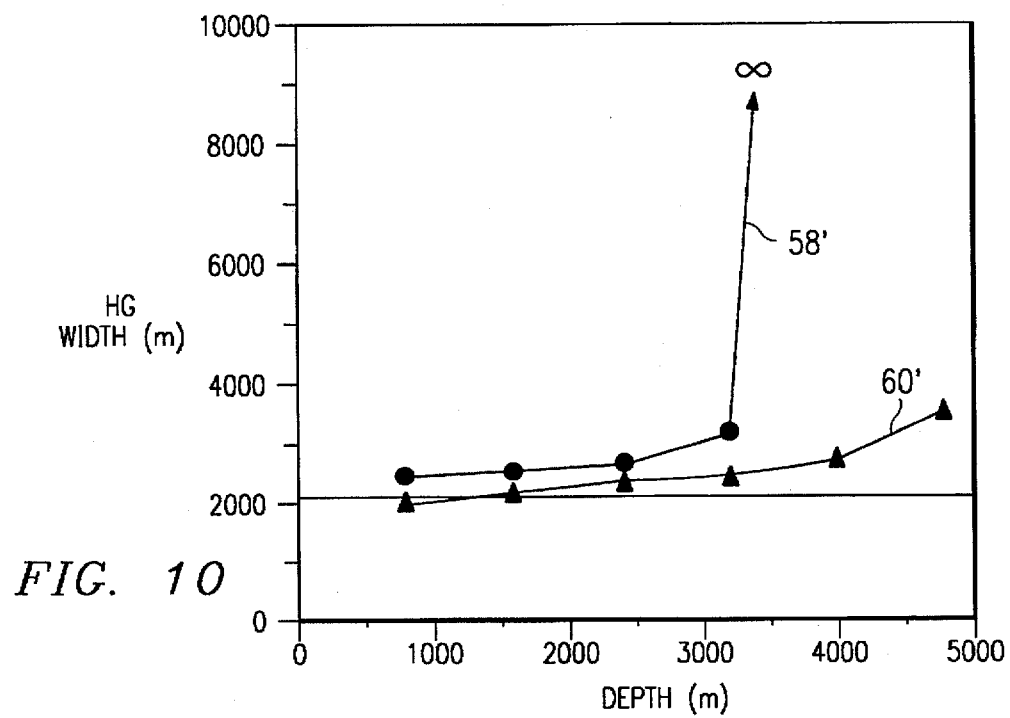
FIG. 10 is a plot of the anomaly width versus depth for the results of FIG. 9b.

Plot 58 of FIG. 9b indicates the simulated deviations in gravitational field presented by Horst blocks 56, plotted in alignment with the lateral position of FIG. 9a. As indicated by peaks 58a through 58d, only the shallowest four Horst blocks 56a through 56d can be detected directly from plot 58 of the magnitude of gravitational field over the survey region. In addition, for deeper detected Horst blocks 56c, 56d, the width of the anomaly in plot 58 increases significantly. In this regard, FIG. 10 shows a corresponding plot 58' of the width of the gravitational field anomaly versus the depth of the top of Horst blocks 56. As is evident from plot 58', the width of the gravitational field anomaly goes to infinity for Horst block 56e, indicating that Horst blocks 56 at depths of 4000 meters and beyond cannot be detected.

In contrast, plot 60 of FIG. 9b indicates the relative amplitude of the coefficient sequence $c^{2,2}$ (i.e., the HLP component) resulting from the preferred embodiment of the invention described hereinabove. Plot 60 clearly shows distinct valleys 60a through 60f corresponding to each of the six Horst blocks 56a through 56f (with reversed polarity relative to the field deviation, as noted above). Corresponding plot 60' of FIG. 10 indicates that the growth in anomaly width in plot 60 is much slower than that from the gravitational field amplitude plot, and allows detectability of the deepest Horst block 56f in this example. As a result, the preferred embodiment of the invention provides significant improvement in the depth of geological structures detectable by analysis of gravitational field measurements. In addition, this improvement in depth and resolution is obtained in a situation in which significant interference from adjacent structures clouds the detection of each structure.

Figure 11A:
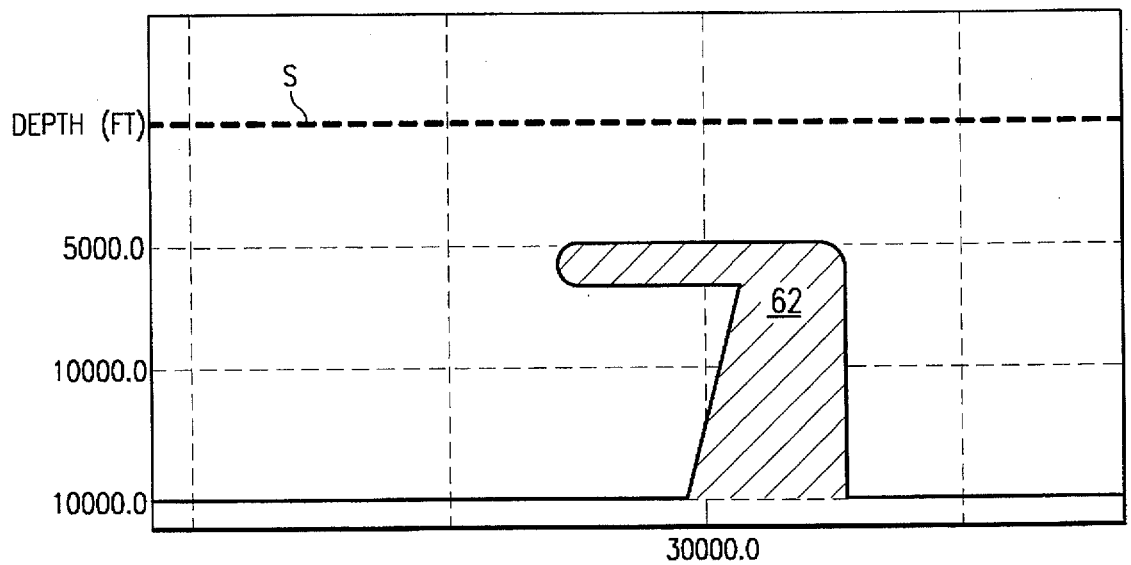
FIGS. 11a through 11c illustrate a simulated example of the preferred embodiment of the invention in analyzing a complex geological structure, as applied to both gravity and magnetic potential field.
Figure 11B:
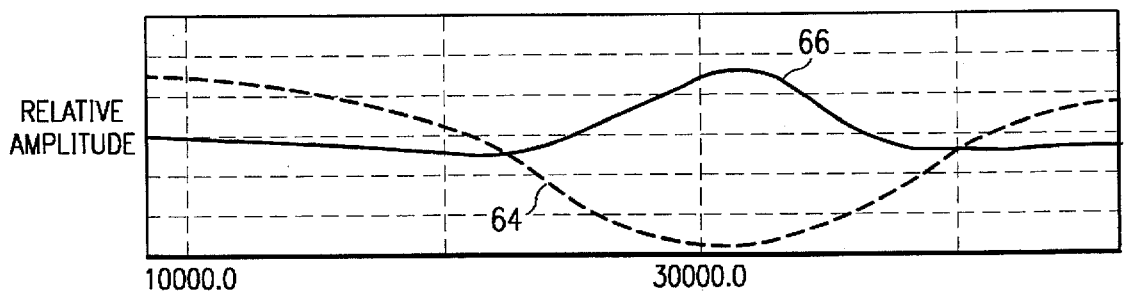
Figure 11C:
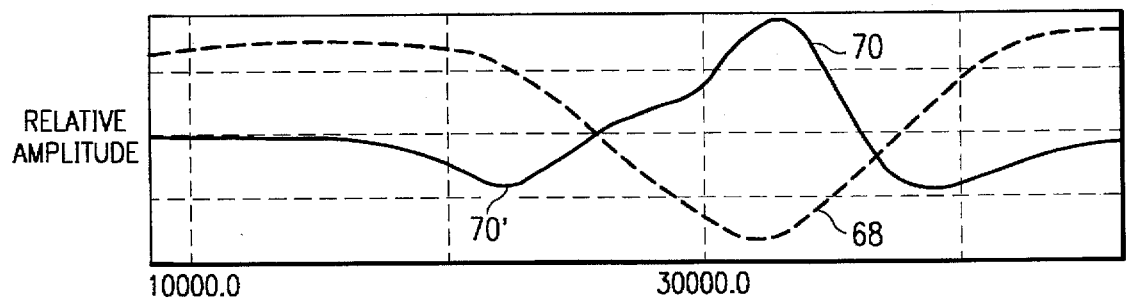

Referring now to FIGS. 11a through 11c, another simulation example of the preferred embodiment of the invention will now be described, illustrating the operation of the present invention on both magnetic and gravitational field amplitudes for typical salt domes as might be found in the Gulf of Mexico, for instance. In this example, geological structure 62 of FIG. 11a has a roof at approximately 5000 ft. below surface S, has an overhanging portion; in this example, structure 62 has a density reduced by 0.2 gm/cm³ relative to the surrounding formation, but is less highly magnetized (by 50 μcgs) than the surrounding formation. FIGS. 11b and 11c are shown in an aligned manner relative to FIG. 11a.

Plot 64 of FIG. 11b is a plot of the gravitational field deviations produced in the region of structure 62. In this case, a valley is present at the location of structure 62, indicating the presence of the lower density structure; however, plot 64 does not provide any indication of the asymmetric cross-sectional shape of structure 62, as the valley of plot 64 is substantially symmetric. Plot 66 is a plot of the coefficient sequence $c^{2,2}$ (component HLP) from the second level wavelet decomposition of plot 64 according to the preferred embodiment of the invention. Plot 66 shows a peak (reversed polarity from the field measurements) at the location of structure 62, and provides an indication of asymmetry, as the peak of plot 66 is somewhat skewed toward the right.

Plot 68 of FIG. 11c indicates the magnetic deviations due to magnetized structure 62, showing a valley at approximately the location of structure 62. Plot 70 of FIG. 11c illustrates the coefficient sequence $c^{2,2}$ (component HLP) from the second level wavelet decomposition of plot 68 according to the preferred embodiment of the invention. This decomposition component clearly indicates an anomalous shape for structure 62, as it has a second peak 70' at approximately the location of the end of the overhang of structure 62. As noted hereinabove, magnetic effects tend to be edge effects, and thus present deviations primarily at corners of magnetized structures. As such, wavelet decomposition of magnetic field data according to the preferred embodiment of the invention is especially helpful in identifying abnormally shaped structures with sharp features, as in the case of structure 62 of FIG. 11a.

Figure 12A:
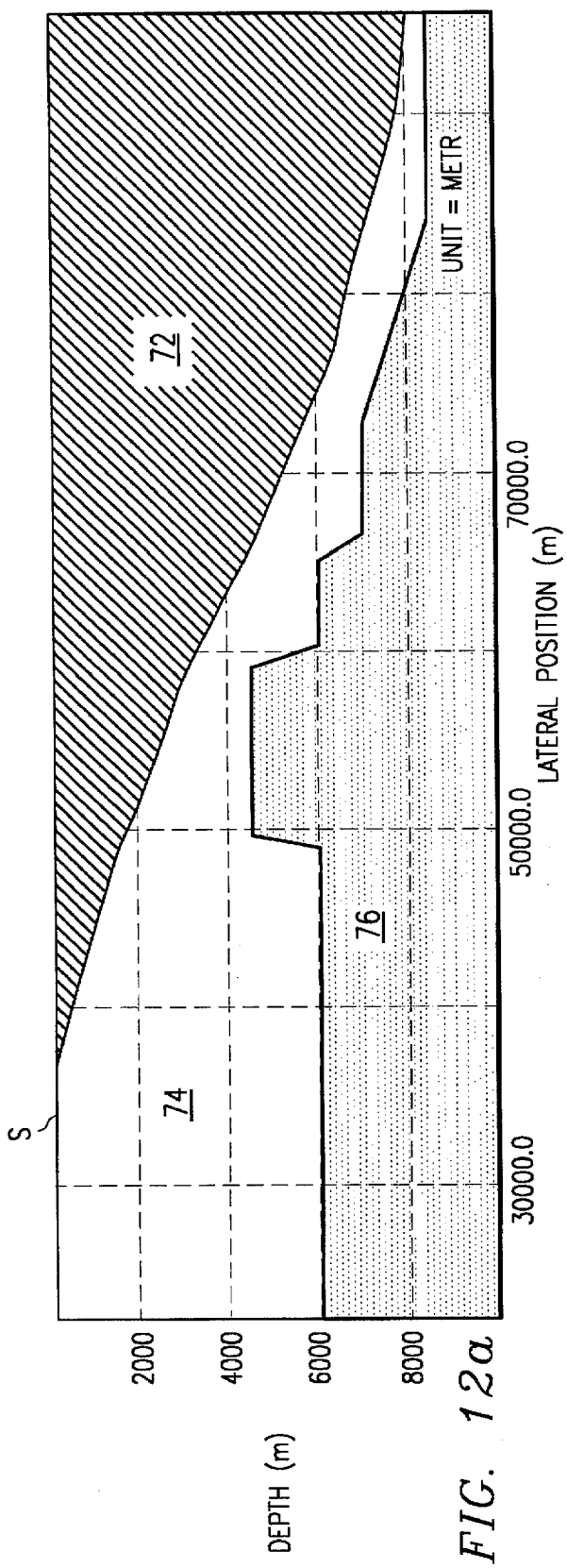
FIGS. 12a and 12b illustrate a simulated example of the preferred embodiment of the invention in detecting features of different wavelength at different locales of the same region.
Figure 12B:
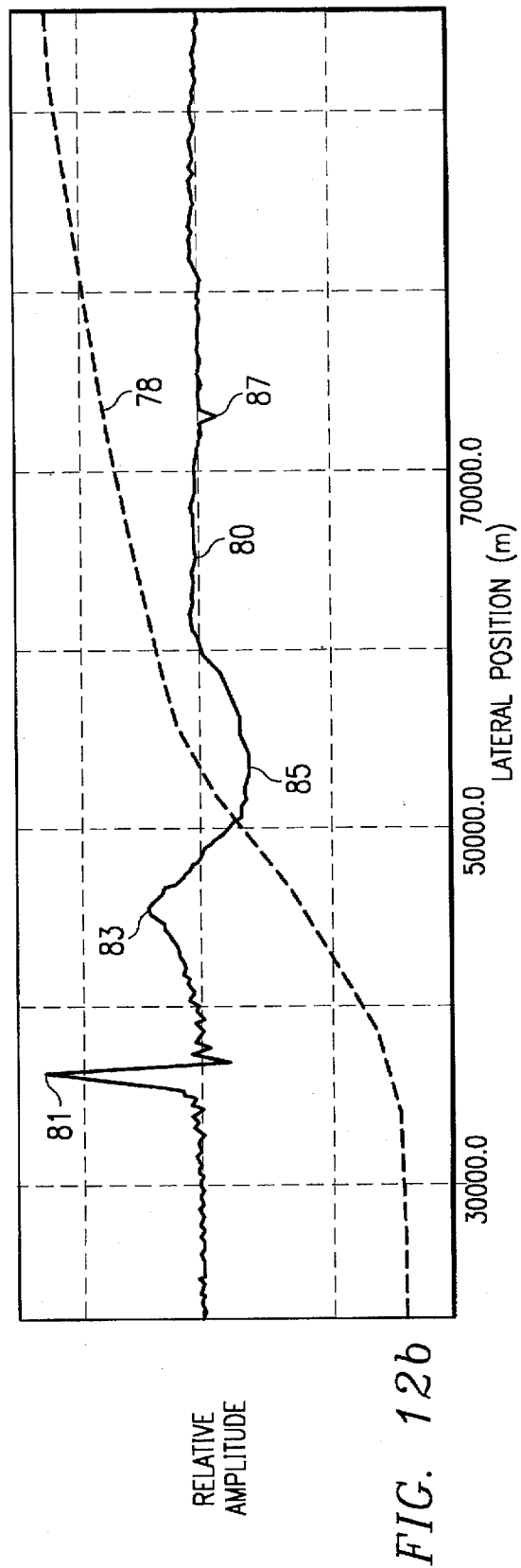

Referring now to FIGS. 12a and 12b, a simulation of the preferred embodiment of the present invention relative to a more complex survey region will now be described, particularly in illustrating the ability of the present invention to detect features of different wavelengths at different survey locations, as might be found in typical overthrust regions throughout the world. In FIG. 12a, a moderately dense overthrust region 72 (density of approximately 2.50 gm/cm³) overlies a high density basement region 76 (density of approximately 2.65 gm/cm³), with an average density region 74 therebetween (density of approximately 2.40 gm/cm³). Basement 76 has certain features of interest that protrude from its top surface.

As shown in FIG. 12b, which is laterally aligned with FIG. 12a, plot 78 is the gravitational field amplitude over the survey area of FIG. 12a. As is evident from plot 78, the gravitational field amplitude increases somewhat gradually moving over overthrust region 72. However, the sharper features of the underlying basement region 76 are not visible, since the high frequency deviations in gravitational field due to these features are attenuated by the earth, and thus do not appear in the plot 78 of the gravitational field at surface S.

Plot 80 is the HLP component from the second level wavelet decomposition of plot 78, according to the preferred embodiment of the invention described hereinabove. Plot 80 does not indicate low frequency deviations in gravity, as provided by overthrust region 72; this is evident from the description of the process above, since plot 80 is based on the high-pass results of the first level decomposition. However, plot 80 includes certain peaks and valleys that correspond to features in the underlying basement layer 76, and which do not appear in plot 78 of the gravitational field amplitude. Peak 80 corresponds to the edge of overthrust region 72, and is indicated by a very sharp peak (i.e., very small wavelength and very high frequency). Moving from left to right, plot 80 also includes a peak 83 of longer wavelength, corresponding to the increasing thickness of overthrust region 72. Valley 85 of plot 80 corresponds to the left most mesa feature of basement region 76, and has a longer wavelength than either of peaks 80, 83. Valley 87 indicates a basement change in slope.

Comparison of the wavelength of peak 80 to that of valley 85 in plot 80 of FIG. 12b readily illustrates that the preferred embodiment of the invention is able to isolate the highest frequency deviation of interest at different locations of the survey region, even in the case illustrated in FIG. 12b where the highest frequency changes from location to location. This feature of the wavelet analysis of the present invention, which is analogous to the space-frequency localization discussed above, provides analysis of the highest resolution available for different locations of the survey region, further improving the visibility into the earth from potential field measurements.

While the examples discussed above are based on simulations of various geological structures, it should be noted that the method of the preferred embodiment of the present invention described above has been applied to the analysis of actual gravitational and magnetic field measurements. Improvements in the resolution of the analysis have been noted in these actual data. As a result, the present invention has not only provided for improved seismic prospecting, but has also resulted in excellent quality control verification of seismic survey data and other measurements of survey areas.

Furthermore, the localizing ability of the present invention enables application of the wavelet decomposition to distinguish only significant anomalies of an entire measurement dataset, rather than requiring the entire dataset to be multiply processed, in several different ways, in order to analyze a locality, as is the case with conventional Fourier analysis. Interactive analysis and study of existing potential field data is therefore greatly improved by the present invention.

As noted above, it has been discovered that selection of packet 3 from the second level of wavelet decomposition using the Daubechies wavelet of length 2 has been beneficial in the analysis of gravity field and magnetic field measurements in the field of geological surveys. According to the present invention, however, it is contemplated that different scale function and corresponding wavelet functions may be useful when applied to similar data, and that it is possible that a different packet, from a different level, may provide the best discrimination and analytical assistance. For example, additional levels of decomposition may be required to reach the frequency band of interest, depending upon the scale-wavelet functions used.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of operating a computer to identify the location of geological features through the analysis of potential field measurements taken at a plurality of surface locations in a survey region of the earth, comprising:

retrieving, from memory, data corresponding to a discrete space-domain representation of measurements of a potential field over a spatial range of the survey region;

performing wavelet decomposition of the discrete space-domain representation to produce a selected decomposition component from at least a second level of decomposition;

expanding the selected decomposition component to correspond to the spatial range; and displaying the expanded selected decomposition component to identify the location of geological features in the spatial range.

2. The method of claim 1, further comprising:

prior to the step of performing wavelet decomposition, filtering the discrete space-domain representation with a noise-reduction filter.

3. The method of claim 2, wherein the noise-reduction filter is a digital Weiner filter.

4. The method of claim 1, wherein the step of performing wavelet decomposition of the discrete space-domain representation uses the Daubechies scale function and corresponding wavelet function.

5. The method of claim 4, wherein the step of performing wavelet decomposition of the discrete space-domain representation comprises:

convolving the discrete space-domain representation with the Daubechies wavelet function of length 2 to produce a first level high-pass component; and convolving the first level high-pass component with the Daubechies scale function of length 2 to produce the selected decomposition component.

6. The method of claim 5, wherein the expanding step comprises:

expanding the selected decomposition component by a factor of four; and interpolating between adjacent values of the expanded decomposition component to create additional values.

7. The method of claim 6, wherein the discrete space-domain representation consists of n values;

and wherein the interpolating step is performed to create sufficient additional values so that the expanded selected decomposition component and the created additional values result in a discrete representation with n values.

8. The method of claim 6, further comprising:

prior to the step of performing wavelet decomposition, filtering the discrete space-domain representation with a noise-reduction filter.

9. The method of claim 8, wherein the noise-reduction filter is a digital Weiner filter.

10. The method of claim 1, wherein the potential field measurements comprise measurements of the gravitational field at selected locations in the survey region.

11. The method of claim 1, wherein the potential field measurements comprise measurements of the magnetic field at selected locations in the survey region.

12. The method of claim 1, wherein the discrete space-domain representation of measurements of a potential field over a spatial range of the survey region is a one-dimensional representation.

13. The method of claim 1, wherein the discrete space-domain representation of measurements of a potential field over a spatial range of the survey region is a two-dimensional representation.

14. A digital computing system for analyzing potential field measurements taken at a plurality of surface locations in a survey region of the earth, comprising:

a memory for storing data corresponding to a discrete space-domain representation of measurements of a potential field over a spatial range of the survey region;

an output device; and a programmed computer, coupled to the memory and to the output device, for:

retrieving the discrete space-domain representation from the memory;

performing wavelet decomposition of the discrete space-domain representation to produce a selected decomposition component from at least a second level of decomposition;

expanding the selected decomposition component to correspond to the spatial range; and for communicating the expanded selected decomposition component to the output device for display.

15. The system of claim 14, wherein the computer is also for:

prior of performing wavelet decomposition, filtering the discrete space-domain representation with a noise-reduction digital filter.

16. The system of claim 14, wherein the computer is programmed to perform the wavelet decomposition by:

convolving the discrete space-domain representation with the Daubechies wavelet function of length 2 to produce a first level high-pass component; and convolving the first level high-pass component with the Daubechies scale function of length 2 to produce the selected decomposition component.

17. The system of claim 16, wherein the computer is programmed to perform the expanding by:

expanding the selected decomposition component by a factor of four; and by interpolating between adjacent values of the expanded decomposition component to create additional values.

18. The system of claim 14, wherein the output device comprises a graphics display.

19. The system of claim 14, wherein the output device comprises a printer.

* * * * *